Patented Apr. 30, 1935

1,999,284

UNITED STATES PATENT OFFICE 1,999,284

AUTOMATIC CLUTCH CONTROL

James W. Colvin, South Bend, Ind., assignor to The Studebaker Corporation, Detroit, Mich., a corporation of New Jersey Application May 31, 1932, Serial No. 614,404

8 Claims. (Cl. 192—.01)

This invention relates to an automatic clutch control and particularly to an automatic clutch control for disengaging the main engine clutch of an automotive vehicle, and has for its prinicpal object the provision of control means of the character described for automatically disengaging the main engine clutch of an automotive vehicle whenever the vehicle is stopped.

A further object is the provision of an automatic clutch control for an automotive vehicle operatively connected with the brake pedal and with the driving mechanism of the vehicle so that the automatic clutch control will be actuated upon application of the brake and will be operated by the momentum of the vehicle.

A still further object of the invention lies in the provision of means for causing the automatic clutch control to be operated upon actuation of the brake pedal only when the forward speed of the vehicle is below a predetermined limit.

It is an additional object of the invention to operatively connect the automatic clutch control with the accelerator of the vehicle in such a manner that the clutch will be held out of engagement by a locking device which is releasable upon initial depression of the accelerator to permit the clutch to engage.

It is another object of the invention to provide means for automatically limiting the rate of reengagement of the clutch to effect desirable operating conditions, and it is also an object to provide a device of the character described which is simple and economical to manufacture and apply, and which is of such simple and rugged construction that it will not easily get out of order in service.

Other objects and advantages of the invention will appear as the description proceeds.

The accompanying drawings show an acceptable mechanical embodiment of the idea of the invention. The drawings, however, are not to be taken as limiting the invention, the scope of which is to be measured solely by the scope of the sub-joined claims.

In the drawings:

Figure 1 is a plan view of an automobile chassis showing the device of the invention applied thereto.

Figure 2 is a plan view of a somewhat enlarged scale of a fragmentary portion of an automobile chassis showing the engine clutch casing, transmission, free-wheeling clutch housing, forward universal joint, a portion of the torque tube, a fragmentary portion of the main engine clutch, and a portion of one of the side frame members of the vehicle, and showing the device of the invention applied to the elements enumerated above.

Figure 1:
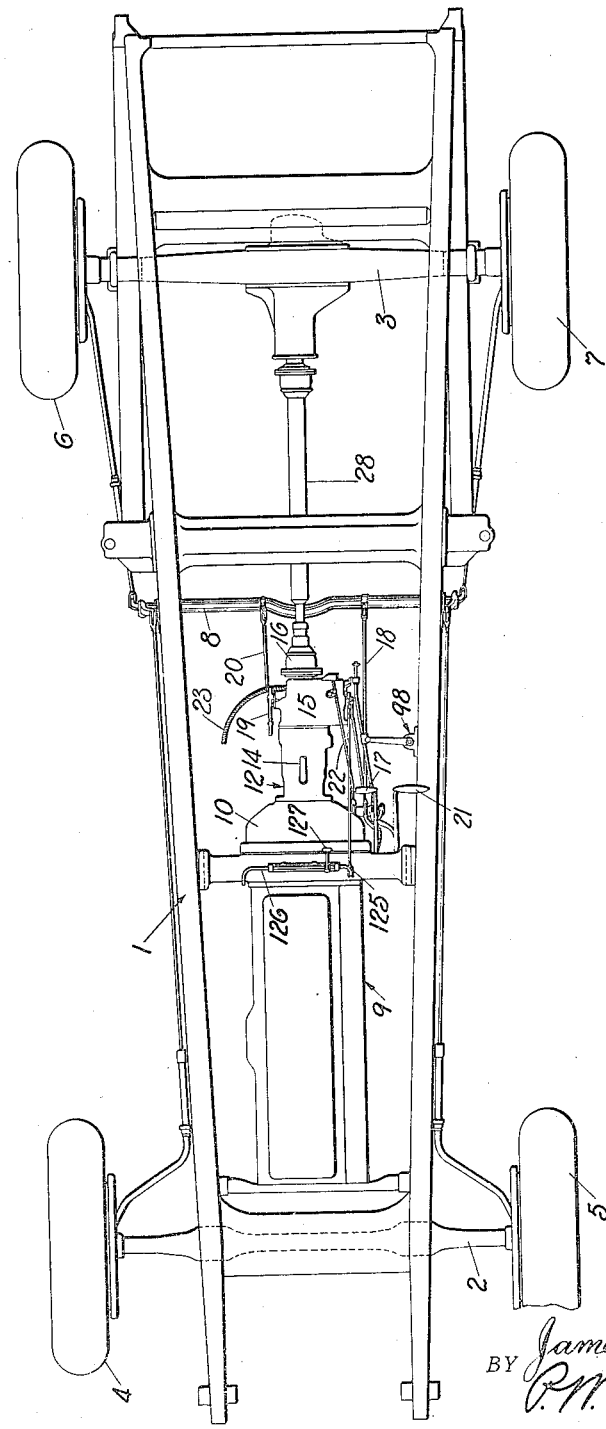

Referring to the drawings in detail, the numeral 1 generally indicates a chassis frame mounted upon a front axle 2 and a rear axle 3 by means of conventional leaf springs. The chassis is supported upon wheels 4, 5, 6 and 7 equipped with brake devices operatively connected to the ends of a cross member 8 rotatably mounted in the chassis frame. The numeral 9 generally indicates an engine and 10 a clutch and flywheel casing in which is disposed an engine clutch 11. 12 generally indicates a vehicle transmission having a cover 13 from which projects a change-speed lever 14. The numeral 15 indicates the casing of a free-wheeling clutch operatively connected between the transmission 12 and the forward universal joint 16. 17 indicates a brake pedal which is mounted at one side of the clutch casing 10 and operatively connected with the cross bar 8 by means of an adjustable linkage 18, and 19 indicates a hand brake lever operatively connected to the cross bar 8 by an adjustable linkage 20. 21 indicates a clutch pedal mounted at one side of the clutch casing 10 and operatively connected with the engine clutch 11 to disengage the clutch to release the engine from the remainder of the driving mechanism of the vehicle. 22 indicates a link member which comprises a portion of the clutch inter-lock operatively connected with the clutch pedal 21 and with the free-wheeling unit 15. The free-wheeling unit and clutch inter-lock therefor may be of the type described in the application of Samuel O. White, Serial No. 579,246 filed December 5, 1931. The numeral 23 indicates a speedometer cable operatively connected to one end of a shaft 24 illustrated in Figure 3, which is operatively connected with the driven element 25 of the free-wheeling clutch by means of a worm 26 mounted on the driven element and a worm wheel 27 mounted on the shaft.

Figure 3:
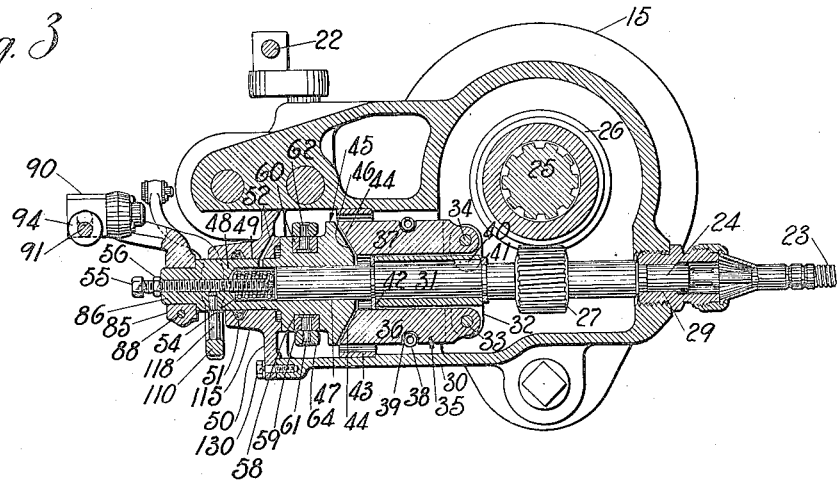
Figure 3 is a transverse sectional view on the line 3—3 of Figure 2 looking in the direction of the arrows.

Still referring to Figure 3, it will be observed that the end of the shaft 24 to which the speedometer cable 23 is connected is mounted in a bearing 29, and that the end of the shaft on the opposite side of the worm wheel 27 extends axially through a cylindrical casing 30 formed on the lower part of the housing 15 of the free-wheeling unit. Mounted upon the end 31 of the shaft 24 by means of the ring 32 and pivotal joints 33 and 34 is a governor generally indicated at 35 lying wholly within the cylindrical casing 30. This governor comprises centrifugal weights 36 and 37 pivotally connected to the ring 32 at 33 and 34 and resiliently restrained against radially outward motion by means of a circular coil spring 38 lying within a groove 39 provided in the weights 36 and 37 intermediate their lengths.

It will be noted that the ring 32 is restrained from rotation upon the shaft 24 by means of the woodruff key 40 or other equivalent locking means and that the ring 32 is restrained from axial motion upon the shaft 24 by means of spring lock rings 41 and 42 mounted in grooves formed in the shaft. In this form of the device I have shown a flat bronze ring 43 mounted in the casing 30 opposite the free ends of the centrifugal weights 36 and 37 to provide a limit for radially outward motion of the free ends of the centrifugal weights and to provide a bearing for the free ends of these weights when they are in their outward limiting position. It is apparent, however, that other suitable bearing structure may be substituted for the bronze ring 43 if desired.

The centrifugal weights 36 and 37 are provided at their free ends with inclined surfaces indicated at 44 which form a hollow cone, and a member generally indicated at 45 having a corresponding frusto-conical face 46 is rotatably and slidably mounted upon the end 31 of the shaft 24 beyond the governor 35. This member 45 is provided with an axial well or bore 47 in which the end of the shaft 24 is telescopically received and with a cylindrical stem or neck portion 48 which extends through a bearing 49 provided in the cover 50 of the cylindrical casing 30, the bearing 49 being provided with a packing ring 51 to prevent escape of lubricant from the casing 30 through the bearing, and with an oil channel 52 for supplying lubricant to the portion 48 of the member 45 which extends through the bearing. The well 47 is deeper than the length of the end 31 of the shaft 24 which projects into it and a coiled compression spring 54 is mounted in the well between the end of the shaft and the bottom of the well. A set screw 55 provided with a lock nut 56 extends axially through the portion 48 of the member 45 into the well 47 adjacent to the end of the shaft 24 to provide a stop to limit the axial motion of the member 45 toward the governor 35. This set screw 55 is adjustable axially in the member 45 by reason of screw threads upon the set screw and corresponding screw threads in the portion 48, and the set screw is maintained in adjusted position by the lock nut 56. The member 45 is also provided within the casing 30 with an annular groove 58 in which lie rollers 59 and 60. These rollers are pivotally mounted upon pins 61 and 62, the outer ends of which are secured in a fork 64 which surrounds a portion of the member 45 within the casing 30.

Figure 4:
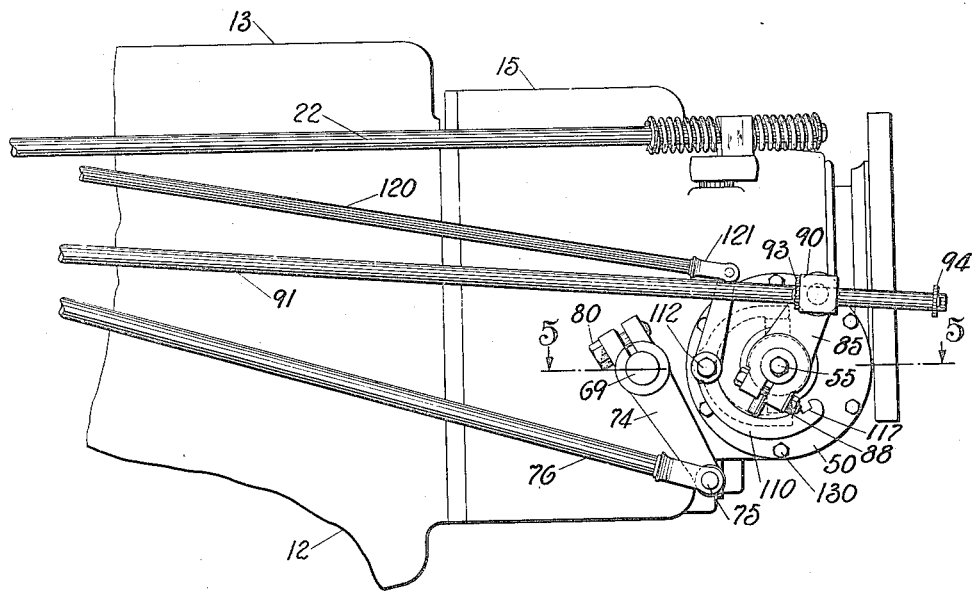
Figure 4 is an elevational view showing a fragmentary portion of the transmission casing and the free-wheeling clutch casing, and the device of the invention applied thereto.
Figure 5:
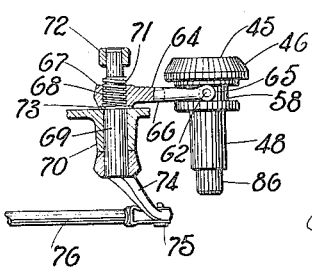
Figure 5 is a detailed view of the brake actuated elements of the device of the invention taken on the line 5—5 of Figure 4.

Referring to Figure 5, it will be observed that fork 64 carries the pins and rollers in its extended ends 65 and is provided with an arm 66 terminating in a bearing 67 provided interiorly thereof with screw threads 68. A shaft 69 journaled in a boss 70 formed on the casing 30 extends through the bearing 67 and is provided with screw threads 71 corresponding with the screw threads 68. The end of the shaft 69 opposite the end journaled in the boss 70 is journaled in a bearing 72 formed integrally with the casing 30, and the shaft is restrained from axial motion by a snap ring 73 mounted in a groove in the shaft. A lever arm 74 is non-rotatably mounted upon the end of the shaft 69 which extends out of the boss 70 and the free end of this lever is connected by means of a pivotal connection 75 with one end of a link member 76, the opposite end of which is operatively connected with the brake pedal 17 by means of a pivotal connection 78 illustrated in Figure 2, the pivotal connection 78 being provided with an adjusting device 79 for adjusting the length of the link 76. As illustrated in Figure 4, the lever arm 74 is adjustably and non-rotatably secured upon the end of the shaft 69 by means of a stud bolt 80 extending through ears formed upon the split end of the arm opposite the free end thereof.

From this description, it will be observed that axial movement of the link 76 caused by actuation of the brake pedal 17 will rotate the shaft 69 by means of the arm 74, and that rotation of the shaft 69 will cause motion of the fork 64 axially of the shaft 24. This motion of the fork 64 will tend to move the member 45 axially of the shaft 24 and into contact with the conical surface 44 of the governor 35.

While I have illustrated in Figure 5 and described above, a mechanism for moving the member 45 comprising a rotatable shaft and corresponding screw threads on the shaft and in a bearing formed in a fork operatively connected with the member 45, it will be apparent that the desired motion of the member 45 may be obtained by other equivalent structures.

Referring particularly to Figures 3 and 4, it will be observed that a lever arm 85 is non-rotatably mounted upon a reduced portion 86 at the end of the portion 48 of the member 45, this arm 85 being adjustably and non-rotatably held upon the reduced portion 86 by means of a bolt 88 extending through ears formed upon a split end of the arm 85. The arm 85 carries at its free end a pivotally mounted block 90 having an aperture therethrough through which extends a link 91, the opposite end of which is connected to the clutch pedal 21 by means of an axially adjustable pivotal connection 92 illustrated in Figure 2. As further illustrated in Figure 2, the link member 91 is provided at the end extending through the block 90 with spaced abutments 93 and 94 in the form of washers rigidly secured upon the link. These spaced abutments provide a form of one-way or over travel connection for the link 91 which permits manual depression of the clutch pedal 21 to disengage the clutch without moving the arm 85. It will be observed from an inspection of Figure 2 that the block 90 is pivotally mounted upon the free end of the lever 85 by means of a pin 95 extending through an aperture formed in the free end of the lever and that a cotter-key 96 is inserted through the projecting end of the pin 95 to maintain the block 90 in operative association with the end of the lever 85.

From this description it will be observed that rotation of the member 45 to rotate the arm 85 will force the link 91 forward to automatically depress the clutch pedal 21 to disengage the main engine clutch.

Figure 2:
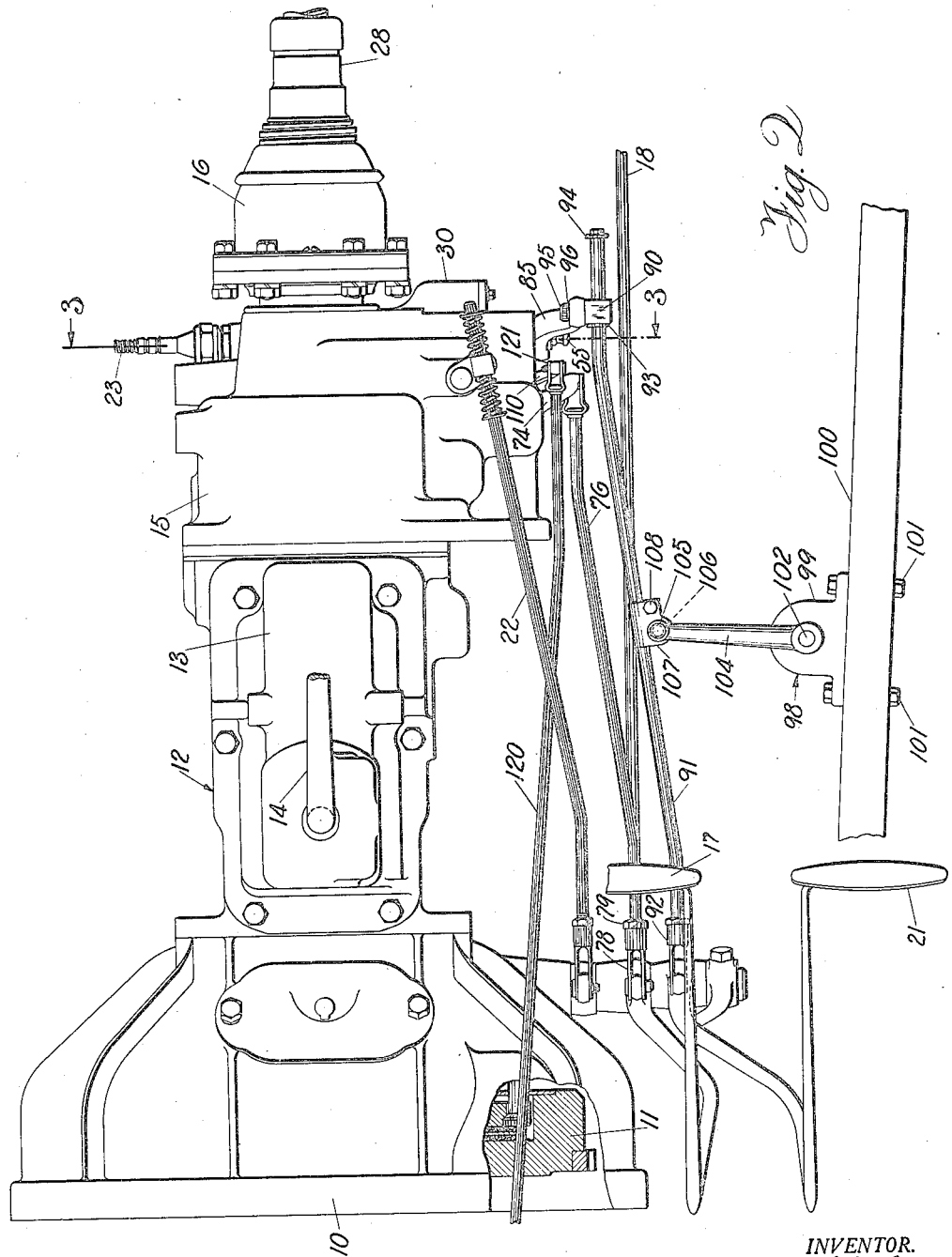

Still referring to Figure 2, it will be observed that I have provided a retarding device generally indicated at 98 to retard the action of the clutch spring in re-engaging the clutch in order to give a smooth starting action to the vehicle. This retarding device comprises, a dash-pot element 99 rigidly connected to one of the side frame members 100 of the chassis frame 1 by means of bolts 101. In the arrangement shown this dash-pot 99 is provided with a vertically disposed rotatable shaft 102 upon the upper end of which one end of an arm 104 is non-rotatably secured. The opposite end of the arm 104 is provided with an aperture through which extends a pin 105 which passes through an elongated aperture 106 in a bracket member 107 which is rigidly secured upon the link 91 as by means of a bolt 108 which tends to securely clamp the bracket 107 upon the link 91.

Referring now to Figure 4, it will be observed that in addition to the above mentioned features, I have also provided a locking device for retaining the arm 85 in its forward limiting position until manually released. This locking device comprises a curved arm 110 pivotally mounted upon the cover 50 by means of a bolt 112 extending through an aperture provided in the arm 110 intermediate its length, the threaded end of the bolt being screwed into a threaded aperture provided in the cover 50. The curved portion of the arm 110 extends partially around a boss 115 provided on the cover 50 in order to provide material for the bearing 48, and at its lower end this arm is provided with a notch 117 adapted to operatively engage with a pin 118 secured in the portion 48 of the member 45 and extending radially outwardly therefrom. A link member 120 has one end pivotally secured to the upper end of the arm 110 by means of a pivotal connection 121, the link 120 extending forwardly over the clutch and fly wheel casing 10 and having its forward end operatively connected to an arm 125 formed integrally with, or attached to, a shaft 126 to which the accelerator pedal 127 is operatively connected. From the description of this element it will be observed that upon rotation of the member 45, the lever arm 85 will be maintained in its forward limiting position to hold the main engine clutch depressed until the accelerator pedal of the vehicle is actuated to release the notch 117 from the end of the pin 118 to permit the arm 85 to swing backwardly under the actuation of the clutch spring to thereby re-engage the main engine clutch 11.

As one method of illustrating the invention I have shown the casing 30 formed as an integral part of the casing 15 of the free-wheeling unit and have shown the cover 50 secured to the casing 30 by means of the stud bolts 130, it will be understood, however, that various changes in the arrangement and proportion of the elements may be made to accommodate the device to various forms of transmission and propeller shaft structure, and that various mechanical equivalents may be substituted for the specific elements herein illustrated and described.

The operation of the device is substantially as follows:

First considering that the vehicle is traveling in a forward direction and is brought to a complete stop by the application of the brake pedal, the operation is as follows: Upon application of the brake pedal the member 45 is moved inwardly upon the shaft 24 by means of the device illustrated in Figure 5 and the linkage connecting this device to the brake pedal until the inner end of the set screw 55 abuts against the corresponding end of the shaft 24. At the same time the governor 35 is being rotated by the shaft 24 by reason of the operative connection comprising the worm 26 and worm wheel 27 between the shaft 24 and the driven element 25. Upon application of the brake the speed of the vehicle will be decreased and as the speed decreases to a predetermined limit, such for instance as ten miles per hour, the centrifugal weights 36 and 37 of the governor 35 will be moved inwardly by the tensional force of the spring 38 until their beveled ends 44 engage the cone surface of the member 45, whereupon a frictional force will be set up between the governor 35 and the member 45 which will rotate the member 45 in a direction to move the free end of the arm 85 forwardly against the abutment 93. This forward motion of the arm 85 moves the link 91 forwardly and by reason of the operative connection of the link 91 with the clutch pedal 21 the clutch pedal will be depressed thereby disengaging the main engine clutch. In the usual operation of an automotive vehicle, when the brake is applied the foot accelerator pedal is released and this pedal is provided with a spring which tends to return the pedal to a closed throttle position. In the operation of the present device, the force of the spring tending to return the accelerator pedal to closed throttle position will also tend to move the link 120 forwardly thereby causing the lower end of the lever 110 to tend to move upwardly. When the arm 85 reaches its forward limiting position the end of the pin 118 will then drop into the notch 117 and the arm 85 will be held in its forward limiting position maintaining the main engine clutch disengaged to permit shifting of the transmission gears by the change-speed lever 14.

Considering now that the vehicle has been stopped and the transmission gears have been shifted into first speed ratio, and it is desired to start the vehicle. All that it is necessary for the operator to do is to simply depress the accelerator pedal. The initial depression of the accelerator pedal will move the lower end of the arm 110 downwardly, releasing the end of the pin 118 from the notch 117, thereby permitting the arm 85 to swing backwardly under the actuation of the main clutch spring to permit the main engine clutch to re-engage. The action of the main clutch spring will be retarded by the dash-pot device 99 to cause a gradual re-engagement of the clutch and consequently a smooth start of the vehicle. Further depression of the accelerator pedal will now increase the speed of the vehicle and from this point the gear shifting is accomplished in the usual manner, manual actuation of the clutch pedal being rendered unnecessary by the inclusion of the free-wheeling device 15.

To explain another phase of the operation of the device, let it be considered that the vehicle is traveling at a comparatively high forward speed and the brake pedal is depressed to momentarily slow up the vehicle. If the speed of the vehicle does not drop below the predetermined limit, an example of which has been indicated as ten miles per hour, the centrifugal weights 36 and 37 of the governor 35 will remain out against the bronze ring 43 and inward motion of the member 45 consequent to depressing the clutch pedal will not cause any frictional force to be set up between the member 45 and the governor 35, and in this case the main engine clutch of the vehicle will be in no way affected.

If it is desired to place the vehicle in reverse gear, this operation must be accomplished by manual depression of the clutch pedal 21 and manual operation of the change-speed lever 14. The over-travel on the link 91 between the abutments 93 and 94 is provided to permit manual actuation of the clutch pedal when desired, as for instance when it is desired to reverse the vehicle.

No provision has been made to release the frictional reaction between the governor 35 and the member 45 when the lever 85 has reached its forward limiting position. If the vehicle continues to travel forwardly at a slow speed after the arm 85 has reached its forward limiting position, slip will occur between the governor 35 and the member 45, and the only effect of the frictional force between these two members will be to add somewhat to the braking effect upon the vehicle. The adjustable set screw 55 has been provided to take up the wear between these two members incident to such operation.

Having now described my invention so that others skilled in the art may clearly understand the same, what I desire to secure by Letters Patent is as follows:

What I claim:

1. In an automotive vehicle, the combination with a main engine clutch, a manually actuated brake and an element driven by the momentum of the vehicle, of means operatively connected to said clutch and said brake and centrifugal means driven by said driven element, said first means being actuated by said brake to engage with said second means to release said clutch when said brake is applied and the speed of the vehicle is below a predetermined limit.

2. In an automotive vehicle, the combination with a main engine clutch, and a free-wheeling clutch including an element driven by the momentum of the vehicle, of centrifugal means driven by said driven element and clutch means operatively connected with said main engine clutch manually actuatable to engage with said centrifugal means when the speed of the vehicle is below a predetermined limit to disengage said main engine clutch.

3. In an automotive vehicle, the combination with a main engine clutch, and a free-wheeling clutch including an element driven by the momentum of the vehicle, of means driven by said driven element, means operatively connected with said main engine clutch manually actuatable to engage with said driven means when the speed of the vehicle is below a predetermined limit to release said main engine clutch, and manually releasable means for locking said main engine clutch in disengaged position.

4. In an automotive vehicle, the combination with an engine, a main engine clutch, a driving mechanism operatively connecting said engine clutch with the driving wheels of the vehicle and a manually operable brake, of centrifugal means driven by said driving mechanism, and means operatively connected with said engine clutch actuated by said brake to engage with said centrifugal means to disengage said engine clutch to release said engine from said driving mechanism when the speed of the latter is below a predetermined limit.

5. In an automotive vehicle, the combination with a main engine clutch, a manually actuated brake, and a shaft driven by the momentum of the vehicle, of centrifugal means driven by said shaft, and means operatively connected with said engine clutch actuated by said brake upon manual application thereof, to engage with said centrifugal means when the speed of the vehicle is below a predetermined limit to thereby disengage said engine clutch.

6. In an automotive vehicle, the combination with a main engine clutch, a manually actuated brake, a shaft driven by the momentum of the vehicle, and an accelerator pedal, of means driven by said shaft actuated by said brake to disengage said engine clutch when said brake is applied, means for locking said clutch in disengaged position, and means actuated by said accelerator pedal to release said locking means to permit said clutch to re-engage.

7. In an automotive vehicle, the combination with a main engine clutch, a manually actuated brake, a shaft driven by the momentum of the vehicle, and an accelerator pedal, of means driven by said shaft actuated by said brake to disengage said engine clutch when the brake is applied, means for locking said clutch in disengaged position, means actuated by said accelerator pedal for releasing said locking means to permit said clutch to re-engage, and means for retarding the re-engagement of said clutch.

8. In an automotive vehicle, the combination with a main engine clutch, a manually actuated brake, an accelerator pedal, a shaft driven by the momentum of the vehicle, and a speedometer shaft driven by said momentum driven shaft, of centrifugal means mounted on said speedometer shaft and driven thereby, means operatively connected to said engine clutch and to said brake actuated by said brake to engage with said centrifugal means when the speed of the vehicle is below a predetermined limit to thereby disengage said engine clutch, means for locking said engine clutch in disengaged position, means actuated by said accelerator pedal for releasing said locking means to permit re-engagement of said clutch, and hydraulic means for retarding the re-engagement of said engine clutch.

JAMES W. COLVIN.